March 22, 1932.   J. J. WHITE, JR   1,850,436
WHEEL
Filed April 20, 1928

Joseph J. White Jr.
INVENTOR

BY
ATTORNEYS.

Patented Mar. 22, 1932

1,850,436

UNITED STATES PATENT OFFICE

JOSEPH J. WHITE, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

WHEEL

Application filed April 20, 1928. Serial No. 271,627.

In making metal wheels for vehicles, such as automobiles, difficulty is experienced in making the wheels of sufficient rigidity and strength within practical limits as to weight. In an effort to secure the desired strength with a minimum of weight wheels have been formed with rolled sheet metal felloes which have been attached to wheel centers by various means. Great difficulty is experienced in making the attachment between the wheel centers and the felloes secure.

With the present invention a rolled wheel felloe is provided and a wheel center is formed by casting, the union between the center and the felloe being accomplished as the wheel is cast. By this method a very secure attachment between the spokes and felloe is provided and the shrinkage incident to the wheel center places the felloe under compression, thus adding to its resistance to shock. Features and details of the invention will appear from the specification and claims.

The manner of practicing the method of the invention and a preferred embodiment of the wheel forming the invention is illustrated in the accompanying drawings as follows:—

Figure 1:
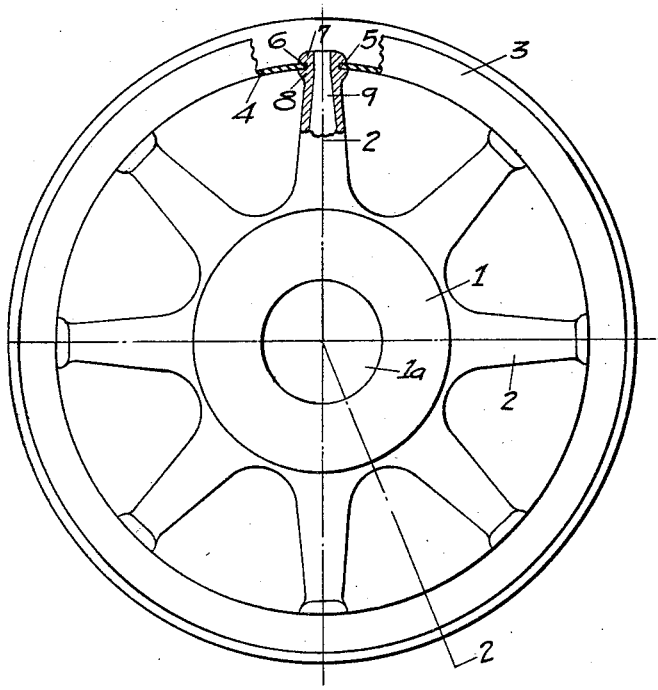

Fig. 1 shows a side elevation of a wheel structure.

Figure 2:
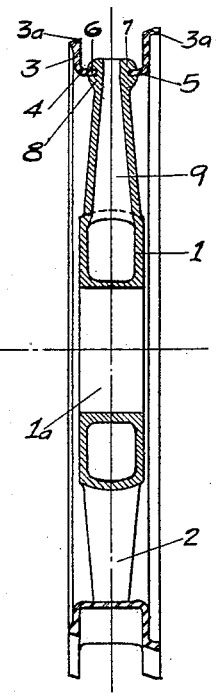

Fig. 2 a section on the line 2—2 in Fig. 1.

Figure 3:
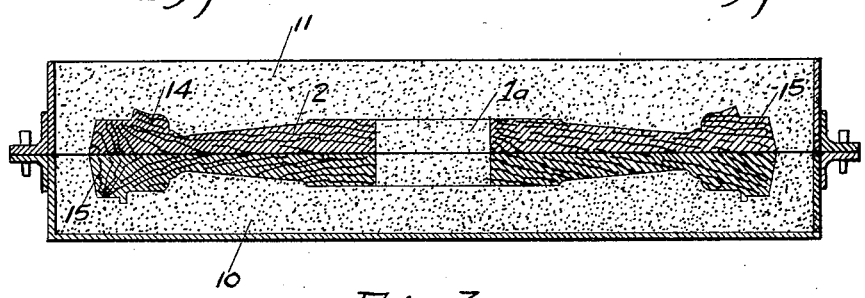

Fig. 3 a section of a mold showing the pattern in place in the mold.

Figure 4:
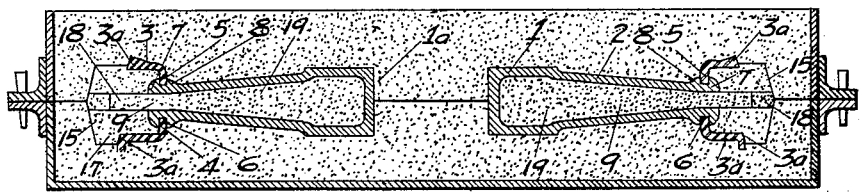

Fig. 4 the mold completed with the metal poured.

1 marks the hub portion of the wheel center, and 2 the spokes. The wheel center has the usual opening 1a and is adapted to be included in the hub structure in the usual manner. A wheel felloe 3 is of channel form and rolled from steel plate, the channel having the base portion 4. Radial openings 5 extend through the base portion 4 for receiving the spokes.

The spokes extend through the openings 5 and the spokes are provided with annular grooves 6 in which the plate surrounding the opening extends. The ends of the spokes are provided with heads 7 and 8 at opposite sides of the plate. The spokes preferably have openings 9 extending through them. The felloe 3 has the usual beveled surfaces 3a for receiving a demountable rim.

In forming the wheel structure I provide a mold, as shown in Fig. 3, having the drags 10 and cope 11 of usual form and provide a pattern 12 having spokes following the contour of the spoke within the felloe and a pattern form 14 corresponding to the exterior surface of the felloe and a core print 15 extending from the frame 14. The mold is opened and the pattern removed in the usual manner. The felloe 3 is put in place in the part of the mold provided by the form 14, as clearly shown in Fig. 4. Prints 17 are arranged within the felloe 3, the prints 17 having core-receiving openings 18. Cores 19 forming the spoke openings 9 are put in place, the outer ends of these cores extending into the openings 18. The inner ends of the cores 19 and the core for the wheel center may be built up in any well known manner of foundry practice. With the parts in place and the mold closed, as shown in Fig. 4, the mold is filled, as usually with molten metal and this flows to the wheel center form, the metal flowing through the openings 5 and forming the heads 7 and 8 at each side of the plate 4. As the casting cools the metal joining the heads 7 and 8 is put under tension, thus securely clamping the walls of the groove 6 on the plate and make a close union between the felloe and the spokes. At the same time the shrinkage of the wheel center, as a whole, places the spokes under tension and the felloe under compression, thus making the wheel, as a whole more effective in receiving road shocks.

With this method utilizing a sheet metal formed felloe the shrinkage incident to the wheel center is of advantage whereas where it is attempted to cast an entire wheel, including the felloe, this shrinkage gives a great deal of trouble. It is very difficult also where steel felloes are used to unite this felloe with a separate wheel center so securely as to prevent more or less movement under shock between the spokes and the felloe. Any movement whatever at this point breaks the finish which is objectionable. As the movement continues, of course, the looseness becomes more objectionable. In my wheel the union of the parts is made very secure by the shrinkage of the metal, the use of the steel felloe makes for lightness and the structure as a whole is one giving little difficulty as to casting.

What I claim as new is:

1. In a wheel, the combination of a wheel felloe of sheet metal channel form having radial openings; and a wheel center having cast spokes extending through the openings and headed on the outer periphery of the felloe, the spokes being under tension and the felloe under compression.

2. In a wheel, the combination of a wheel felloe having radial openings; and a cast wheel center having spokes, said spokes being hollow and extending through the felloe openings and having a head on the outer periphery of the felloe, said spokes being under initial tension.

3. In a wheel, the combination of a wheel felloe having radial openings; and a wheel center having cast spokes, said spokes being hollow and extending through the felloe and having a transverse groove, the radial faces of the walls of which engage the felloe, said spokes being under initial tension.

4. In a wheel, the combination of a wheel felloe having radial openings; and a wheel center having cast spokes, said spokes being hollow and extending through the felloe and having a transverse groove, the radial faces of the walls of which engage the felloe, the portion of the spokes between the radially faced walls being under shrinkage tension and clamping the walls of the groove on the felloe.

5. In a wheel, the combination of a wheel felloe having radial openings therein; and a wheel center having cast spokes extending through the felloe, said spokes having transverse grooves, the radial faces of the walls of which engage the felloe, the portion of the spokes between the radially faced walls being under shrinkage tension clamping the walls of the groove on the felloe, said spokes within the felloe being under tension and the felloe under compression.

In testimony whereof I have hereunto set my hand.

JOSEPH J. WHITE, Jr.